No. 855,022. PATENTED MAY 28, 1907.
J. W. C. SMITH.
TRIAL FRAME FOR OPTICIANS' USE.
APPLICATION FILED APR. 23, 1906.
2 SHEETS—SHEET 1.
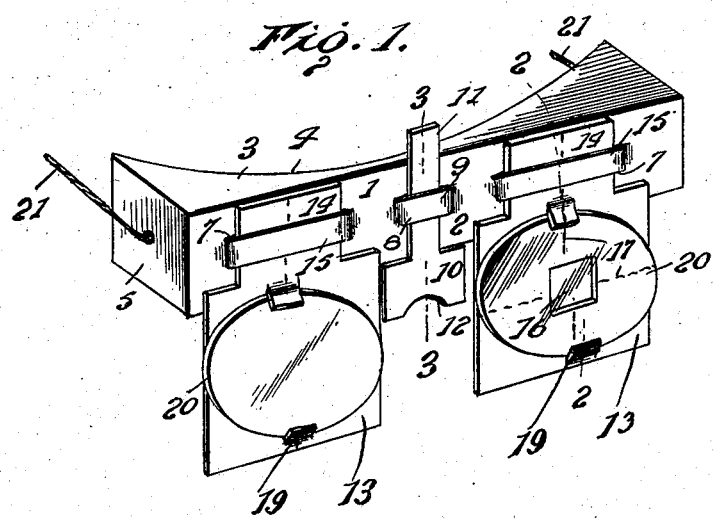
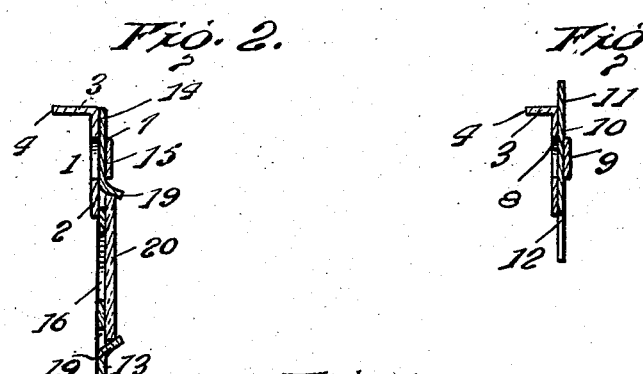
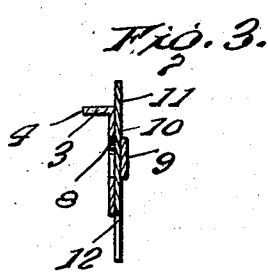
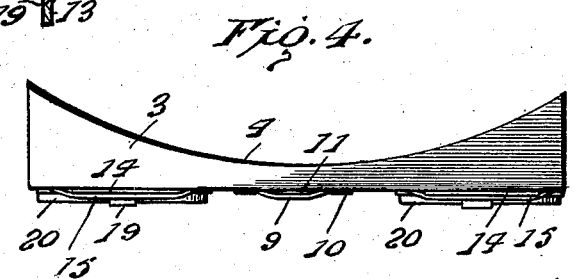
Inventor
J. W. C. Smith
Witnesses
By
Attorneys No. 855,022. PATENTED MAY 28, 1907.
J. W. C. SMITH.
TRIAL FRAME FOR OPTICIANS' USE.
APPLICATION FILED APR. 23, 1906.

2 SHEETS—SHEET 2.

Inventor
J. W. C. Smith

Witnesses

By
Attorney

UNITED STATES PATENT OFFICE.

JOHN W. C. SMITH, OF WEST LAFAYETTE, INDIANA.

TRIAL-FRAME FOR OPTICIANS' USE.

No. 855,022. Specification of Letters Patent. Patented May 28, 1907.

Application filed April 23, 1906. Serial No. 313,331.

*To all whom it may concern:*

Be it known that I, JOHN W. C. SMITH, a citizen of the United States, residing at West Lafayette, in the county of Tippecanoe and State of Indiana, have invented certain new and useful Improvements in Trial-Frames for Opticians' Use, of which the following is a specification.

The object of my invention is to provide an improved trial frame for opticians' use, the frame being particularly designed for use in a mail order business so that a frame may be sent conveniently in the mail to a patient at a distance, together with a set of numbered trial lenses, enabling the patient at home and without the personal attendance of the optician, to adjust the different lenses upon the trial frame and select the proper lenses and also enabling the proper lenses to be temporarily attached to the trial frame by the patient, in the proper pupilary positions as well as enabling the patient to so adjust the trial frame with respect to the proper nose piece to be used according to the height of the nose on or above the horizontal pupilary line and with approximately the proper contour to accurately fit the bridge of the patient's nose. After the patient has adjusted the lenses and the proper trial nose piece to the trial frame, the trial frame may be readily sent back to the optician with the proper lenses secured thereto and in the proper pupilary positions, so that the trial frame may be used by the optician in the nature of a pattern from which to construct and adjust the desired eyeglasses. And a further object of the invention is to provide an improved device of this character which may be readily mailed in a knocked down or flat condition and set up or adjusted for use by the patient, it being understood that a set of directions for the use of the frame will accompany each trial frame sent out.

Figure 5:
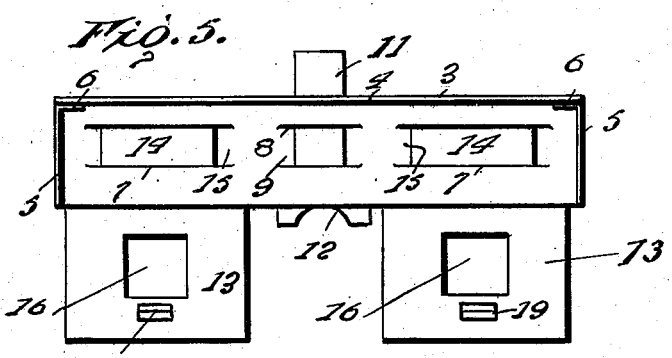
Figure 6:
Figure 7:
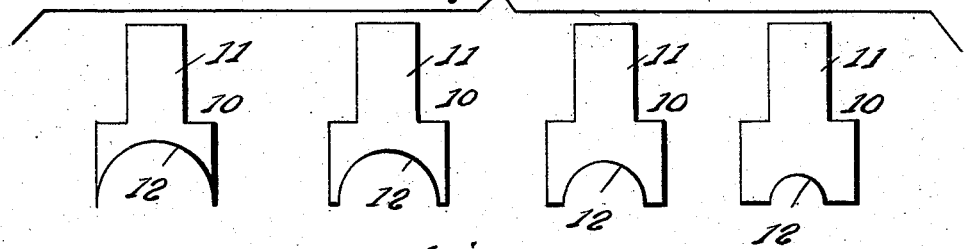
Figure 8:
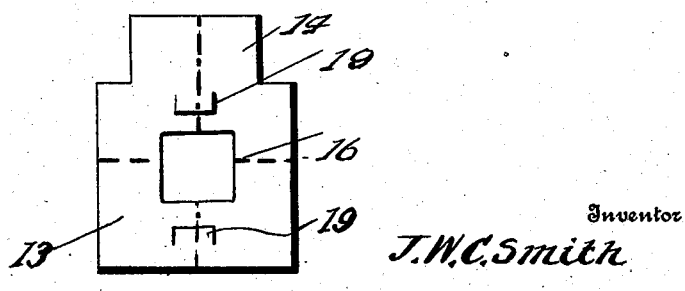

For a full description of the invention and the merits thereof and also to acquire a knowledge of the details of construction of the means for effecting the result, reference is to be had to the following description and accompanying drawings, in which:

Figure 1 is a perspective view of the invention. Fig. 2 is a transverse section on the line 2—2 of Fig. 1. Fig. 3 is a similar view on the line 3—3 of Fig. 1. Fig. 4 is a top plan view. Fig. 5 is a rear view. Fig. 6 is a view of the blank from which the base of the frame is formed. Fig. 7 is a detail view illustrating a set of trial nose pieces. Fig. 8 is a detail view of one of the eye pieces.

Corresponding and like parts are referred to in the following description and indicated in all the views of the drawings by the same reference characters.

Referring to the drawings, the numeral 1 designates the base of the frame, which like the other main parts thereof, is preferably constructed of stiff card board. The base 1 in its initial condition is cut into a blank form illustrated in Fig. 6 and it is scored on one side in a preferably heavy manner along the dotted lines indicated in said figure, so that it may be shipped in flat condition and subsequently bent to the required shape by the patient. When bent along the scored lines, the base produced comprises a main body portion 2 of substantially rectangular form and designed in operation to assume a vertical position, a horizontal member 3 extending at right angles to the body portion 2 and provided with a curved edge 4 designed to fit the patient's forehead, and two corner pieces 5 that are bent inwardly toward the body portion 2 and the side edges of the horizontal member 3 and are provided with angular flanges 6 designed to be secured by some adhesive substance to the under side of the member 3 at the side edges thereof, as clearly illustrated in the drawings. If desired these flanges may be prepared with the adhesive substance and sent to the patient in such condition, so that it is only necessary for the patient to bend up the base 1 as above indicated to secure the parts in their proper operative relation to each other by simply moistening the flanges 6 and causing them to adhere to the under side of the member 3. The base 1 may also be provided with two outer pairs of slits 7 arranged parallel and extending longitudinally and an intermediate pair of parallel slits 8 also extending longitudinally and preferably in alinement with the two pairs of slits 7. These slits 7 are either to be indicated by black lines when the device is sent on to the patient so that the latter by a knife or the like may cut the slits for their own use, or the slits may be made by the same operation that cuts the blank and scores the lines before mentioned.

The intermediate pair of slits 8 produce a retaining strip 9 for a set of trial nose pieces 10. Each nose piece 10 is provided with a tab or shank 11 at one side and is formed in its lower edge with a curved recess 12. It is intended that the nose pieces 10 be sent to the patient in sets of any desired number, the recesses 12 of the different nose pieces being of different contour so that the patient may determine approximately the proper shape that the bridge of his or her nose requires for the permanent nose piece to be subsequently formed and adjusted by the optician. After the proper trial nose piece has been determined upon according to the recess 12 thereof, the shank 11 of said nose piece is inserted through the guide strip 9 of the base 1 of the frame, and it is moved up and down until the required height has been reached with respect to a plane on or above the horizontal pupilary line.

In addition to the trial nose piece 10, my improved trial frame includes a pair of eye pieces 13 each of which is provided with a tab or shank 14 intended to be inserted through one of the guide strips 15 produced by the outer pairs of slits 7. The eye pieces 13 have on one face vertical and horizontal lines to enable the patient to obtain a positive centering of the pupils in the eye apertures 16 cut in said eye pieces, at the intersection of the said horizontal and vertical lines. Said lines are designated 17 in the drawings.

Retaining lugs 19 are formed on the pieces 13, preferably by cutting angular slits therein and turning up the material of which the pieces are formed. A closure 20 is included among the elements of the trial frame, said closure being designed in the conventional form or marginal outline of a lens, and being designed to close the eye aperture of either eye piece, so that separate eye tests may be made to give each eye its proper correction. Apertures are punched in the corner pieces 5 and a preferably elastic band 21 has its ends secured in said apertures or attached to the corner pieces in any desired manner, and is designed to extend around the patient's head to secure the trial frame against the forehead of the patient in proper position for the trial of the eyes.

In the practical use of my improved trial frame, it is to be understood that the set of numbered lenses accompanies the outfit, said lenses being of sufficient number to correct all presbyopic vision. After the patient has received the lenses and my improved trial frame, the base of the frame is set up to form the complete device shown in the drawings, in the manner before described, and adjusted to the patient's head. The proper nose piece is then inserted in the guide strip 9 and is adjusted vertically to obtain the position or height of the nose on or above the horizontal pupilary line. The eye pieces are then attached as before described to the base of the frame with the eye apertures 16 cut therein and with the retaining lugs 19, and the lenses are tried until the proper one is obtained, the closure 20 enabling the eyes to be tested separately. Having obtained the proper lenses, the same may be adjusted on the eye piece to show any necessary pupilary distance.

From the foregoing description in connection with the accompanying drawings, it will be seen that I have provided a simple and cheap device for the purposes set forth at the outset of the specification, and one which will give very accurate results, or as accurate as could possibly be given without the personal attendance of an optician, and one which is sanitary, as the device may be so cheaply made as to be used with one patient only and then either destroyed or filed away as a pattern for future use in constructing other glasses for the same person.

It is to be understood that my invention is not limited to the exact arrangement of guide strips 9 and 15 for the attachment of the trial nose piece and eye pieces, as other means for adjustably securing these parts to the base of the frame may be employed. As the member 3 of the base 1 as well as the corner pieces 5, may be flattened out again after the device has been used, it may be shipped back to the optician in a substantially flat condition and at the lowest mail charges, thereby increasing the utility of the device.

It is to be understood that the guide strips 9 and the guide strips 15 retain their respective attached parts by sufficient frictional contact to prevent accidental displacement, and that the guide strips 15 are preferably longer than the width of the respective shanks 14 in order that the eye pieces 13 may be adjusted in a horizontal plane toward and from each other as well as in a vertical plane independently of each other.

Having thus described the invention, what is claimed as new is:

1. A device of the character described, comprising a base, eye pieces carried by said base, the latter being provided with a guide strip between said eye pieces, and a nose piece provided with a shank arranged for insertion underneath said guide strip and adapted for frictional engagement therewith, whereby the nose piece may be held in different adjusted positions with respect to the base.

2. A device of the character described, comprising a base, a nose piece carried by said base, the base being provided with longitudinally extending guide strips on opposite sides of said nose piece, and eye pieces provided with shanks arranged for insertion underneath said guide strips and adapted for frictional engagement therewith, as and for the purpose set forth.

3. A device of the character described, comprising a base, a nose piece designed for adjustable attachment for said base, and independently adjustable eye pieces also designed for attachment to said base and arranged for both vertical and horizontal adjustment thereon.

4. A device of the character described, comprising a base provided with three longitudinal guide strips arranged in substantially longitudinal alinement, and removable and adjustable eye pieces and a nose piece designed for insertion in said guide strips.

5. A device of the character described, comprising a base consisting of a body portion, corner pieces provided with angular flanges at one side, and a member 3 having a curved edge and extending angularly to the body portion, the said flanges being designed for attachment to the ends of the said member 3, and adjustable eye pieces and a nose piece, arranged for attachment to said base.

6. In a device of the character described, a supporting base for adjustable eye pieces and nose piece, the said base resulting from bending up a blank consisting of a rectangular body portion 1, a member 3 provided with a curved edge 4, and corner pieces 5 provided with angular flanges 6 designed for attachment to the ends of the member 3.

7. A device of the character described, comprising a base consisting of a body portion, an angularly disposed portion designed to abut against a person's forehead, and corner pieces designed to be connected to the ends of the angular member, the body portion 1 being provided with slits producing guide strips, adjustable eye pieces and nose piece arranged for engagement by said strips, and a head band attached to said base.

8. A device of the character described, comprising a base of sheet material resulting from bending up a blank consisting of a body portion, a member 3 with a curved edge and adapted to engage a person's forehead and corner pieces 5 provided with flanges arranged for attachment to the ends of the member 3, means for securing said base to a person's forehead, a nose piece of sheet material arranged for vertically adjustable connection to the body portion of the base and eye pieces also arranged for adjustable connection to the body portion of the base and constructed of sheet material, said eye pieces being provided with central openings and with integral lugs arranged to detachably hold a lens.

9. A device of the character described, comprising a base arranged for detachable engagement with a person's forehead, and a nose piece and two eye pieces arranged for connection to said base, the eye pieces being constructed of sheet material and having lugs struck up therefrom, said lugs being adapted to hold a lens.

In testimony whereof I affix my signature in presence of two witnesses.

JOHN W. C. SMITH. [L. S.]

Witnesses:
J. B. CUNNINGHAM,
J. A. HARRIS.